US008024834B2

(12) United States Patent
MacNeil

(10) Patent No.: US 8,024,834 B2
(45) Date of Patent: Sep. 27, 2011

(54) VEHICLE WASHING SYSTEM

(75) Inventor: Daniel J. MacNeil, Barrie (CA)

(73) Assignee: MacNeil Wash Systems Limited, Barrie, ON ( * ) Notice: Subject to any disclaimer, the term of this patent is extended or adjusted under 35 U.S.C. 154(b) by 958 days.

(21) Appl. No.: 11/615,108

(22) Filed: Dec. 22, 2006

(65) Prior Publication Data

US 2007/0151054 A1 Jul. 5, 2007

Related U.S. Application Data

(60) Provisional application No. 60/754,686, filed on Dec. 29, 2005.

(51) Int. Cl.
*B60S 3/06* (2006.01)
(52) U.S. Cl. ......... 15/53.3; 15/53.2; 15/53.4; 15/DIG. 2
(58) Field of Classification Search .......... 15/53.1–53.4, 15/97.3, DIG. 2
See application file for complete search history.

(56) References Cited

U.S. PATENT DOCUMENTS

| | | | | | |
|---|---|---|---|---|---|
| 3,546,728 | A | * | 12/1970 | Hanna | 15/53.3 |
| 3,649,980 | A | * | 3/1972 | Ebeling | 15/53.3 |
| 3,662,418 | A | * | 5/1972 | Kamiya | 15/53.2 |
| 3,795,929 | A | * | 3/1974 | Thompson | 15/53.2 |
| 3,798,696 | A | * | 3/1974 | Cirino | 15/53.2 |
| 3,806,978 | A | * | 4/1974 | Takeuchi | 15/53.3 |
| 3,822,429 | A | * | 7/1974 | Thompson | 15/53.2 |
| 3,822,431 | A | * | 7/1974 | Van Brakel | 15/53.4 |
| 4,020,518 | A | | 5/1977 | Harding et al. | |
| 4,035,862 | A | * | 7/1977 | Ennis et al. | 15/53.3 |
| 4,207,642 | A | * | 6/1980 | Arato | 15/53.3 |
| 4,338,698 | A | | 7/1982 | Beer et al. | |
| 4,375,116 | A | | 3/1983 | Hora | |
| 4,495,667 | A | * | 1/1985 | Roncaglione et al. | 15/53.2 |
| 4,691,401 | A | | 9/1987 | Machin | |
| 4,724,565 | A | * | 2/1988 | Higaki et al. | 15/53.2 |
| 5,886,648 | A | * | 3/1999 | McElroy et al. | 340/943 |
| 6,260,225 | B1 | | 7/2001 | Bowman | |
| 6,430,463 | B1 | | 8/2002 | Lysaght | |
| 6,709,530 | B1 | * | 3/2004 | Dietsch et al. | 134/18 |

FOREIGN PATENT DOCUMENTS

| | | | |
|---|---|---|---|
| EP | 396054 | * | 11/1990 |
| EP | 407695 | * | 1/1991 |
| GB | 2225561 | * | 6/1990 |
| JP | 62-221956 | * | 9/1987 |
| JP | 4-197856 | * | 7/1992 |
| JP | 4-218452 | * | 8/1992 |
| JP | 6-156209 | * | 6/1994 |
| JP | 2004-203254 | * | 7/2004 |

OTHER PUBLICATIONS

Why We Use . . . Variable Frequency Drives, Designfax, http://www.manufacturingcenter.com/dfx/archives/1004/1004whyweuse.asp, Oct. 2004.

* cited by examiner

*Primary Examiner* — Mark Spisich

(57) ABSTRACT

A vehicle washing apparatus includes a brush mounted to a drive shaft, a position locator for positioning the brush relative to a vehicle to be washed and a motor for rotating the drive shaft. A controller positions the brush proximate the vehicle for washing. A load sensor, for sensing the load on the drive shaft, is connected to the controller so that the controller may react to the sensed load exceeding a threshold by controlling a retraction of the brush from the vehicle. Additionally, parameters related to the operation of the brush may be determined based on information related to the size of the vehicle to be washed, where the size information is obtained by sensors.

25 Claims, 9 Drawing Sheets

VEHICLE WASHING SYSTEM

CROSS-REFERENCE TO RELATED APPLICATION

This application claims priority from U.S. provisional application No. 60/754,686, filed Dec. 29, 2005.

FIELD OF THE INVENTION

The present invention relates to vehicle wash systems in which a vehicle is acted upon by brushes.

BACKGROUND

Automated vehicle washing has a history reaching back several decades. In some cases the vehicle to be washed is driven or conveyed through a car wash structure or tunnel while being acted upon by washing elements. In other cases, the vehicle is stationary and the car wash structure includes washing elements that move relative to the vehicle while acting upon the vehicle. In any type of automated vehicle washing system, car wash structures often include washing elements designed to wash particular portions of the vehicles.

One known type of washing element is a cylindrical brush mounted on a shaft and/or hub that rotates about a generally horizontal and longitudinally oriented axis and is usually configured to brush the side surfaces of the vehicle. The horizontal and longitudinally mounted brushes may be arranged in a tunnel conveyor system along with various other brushes including transversely mounted roll-over brushes to clean the top of the vehicle and vertically mounted brushes to clean the front and rear portions. Water and soap are typically applied to the brush cleaning elements and/or to the surface of the vehicle to be cleaned to assist in the cleaning process. The brushes typically engage the generally vertically oriented and longitudinally extending side surfaces of the vehicle along with the generally outward facing surfaces of the wheels, tires and associated hubcaps of the vehicle. Such a brush may, during the course of the cleaning operation, engage a lower panel portion of a longitudinally extending side surface as the vehicle moves past the cylindrical brush.

Typically, two spaced and opposed, generally horizontally oriented and longitudinally extending cylindrical brushes may be employed for washing the lower portion and wheels of both the left (driver) and the right (passenger) sides of the vehicle. Additionally, these horizontal and longitudinally oriented, cylindrical brushes are mounted so that the transverse distance between the cylindrical brushes can be varied, to accommodate vehicles of various widths. The adjustment of the transverse positions of each of the opposed brushes may be provided by a position locator or apparatus (hereinafter referred to as a "position locator") controlled by a control device of some kind.

While the position locator has positioned a horizontal, rotating, usually cylindrical, brush proximate a vehicle so that the cleaning members of the cylindrical brush may contact and wash the side and wheels of the vehicle, the effectiveness of the washing may be, in part, related to the direction of rotation of the cylindrical brush and the proximity of the cylindrical brush axis to the vehicle side. It has been found that, when washing the driver's side of the vehicle, clockwise rotation of the cylindrical brush (as viewed from the front of the vehicle) provides more effective washing than counter-clockwise rotation of the cylindrical brush. (The opposite is true for the passenger side of the vehicle). This is because the brush members tend to engage the side with an upward motion, which it has been found is advantageous in removing dirt etc. from the surface of the side panel.

However, there are significant problems associated with rotating the brushes in this direction in that during the rotational movement of the cylindrical brush against the side of the car, and the relative upward motion of the individual cleaning elements relative to the side surface, friction between the cleaning members and the lower, rocker panel of the vehicle can tend to draw the cylindrical brush toward the under side of the vehicle. Additionally, it has been recognized that the cleaning members are quite likely to fairly consistently get caught on underside edges and other features that are on or proximate the underside of the vehicle when brushes rotate in this direction. This can cause the rotating brush to experience a significant increase in load and torque and can result in damage to the drive motor for the cylindrical brush.

Accordingly, horizontally and longitudinally oriented brushes adapted for cleaning the side surface of the vehicle are almost always rotated in the opposite direction (i.e., with relative downward motion of the cleaning elements against the side surface of the vehicle). This movement significantly reduces the aforesaid underside movement and catching problems, but impacts significantly upon the quality of the cleaning.

U.S. Pat. No. 4,691,401, issued Sep. 8, 1987 to Machin (hereinafter "Machin"), addresses a recognized problem wherein a vertical, rotating, cylindrical brush may, on occasion, catch in a convergent slot or gap formed by a vehicle bumper and a trailer hitch or coupler. In response to sensing an atypical event, such as, for example, a decrease in rotational motion of the brush, a change in brush orientation, a change in brush torque and/or a change in drive motor current, the rotation direction of the brush is reversed. This system however is not suitable for controlling a relatively continuous tendency of a horizontal, longitudinal brush to be dragged underneath the car resulting in the increasing torque and load on the brush.

One solution to the aforesaid problems in the horizontal and longitudinal oriented brush, is the split brush system, which employ two brushes configured in vertically stacked, side by side relation to each other and which have separate brushes rotating in opposite directions to each other. This solution is however somewhat unsatisfactory and also relatively expensive.

SUMMARY

A new solution to the aforementioned problems has now been recognized by the present inventors. In one example embodiment, while a rotating, cylindrical brush is brought into contact with a side panel of a vehicle by a position locator and applies a transverse load to the side of the vehicle, the load or torque acting on the cylindrical brush may be sensed by a sensor. The load sensing can be done by extracting load, torque, current and/or other information from a Variable Frequency Drive (VFD) which can be used in driving the rotation of the brush. Responsive to the sensed load exceeding a predetermined maximum value or set point, the position locator may be controlled and operate to retract the cylindrical brush away from the vehicle until the sensed load drops and then advanced again toward the side of the vehicle.

The VFD can be self contained, such that, once the VFD has been turned on and starts to drive the motor which rotates the brush, the VFD can perform the control function. The VFD may be operable to have a predetermined maximum load or torque set point, or other electrical characteristic set point, entered into its memory. The VFD may also be operable to monitor, on a substantially real time basis, a characteristic associated with the motor, such as the actual load or torque, which characteristic provides an indication of the load or torque on the brush. The VFD may also, upon the monitored load, torque or other characteristic exceeding the set point, send a signal to the position locator to release the transverse load applied to the vehicle by the brush and may also cause the brush to move away.

A Programmable Logic Controller (PLC) for the entire system can be employed and, in one embodiment, is only used to turn on the motor that drives the brush. The VFD may include a PID feedback loop or other control feedback loop to control the movement of the horizontal longitudinal brush. This provides a continuous feedback loop that keeps the process flowing normally by taking corrective action whenever there is any deviation from the desired set point, which, in one embodiment, may be the threshold torque or load on the brush as sensed by the sensor in the VFD.

Advantageously, the cylindrical brush may thus be rotated in a direction providing relative upward rotational movement having contact with the lower side of the vehicle without concern that the brush will be drawn toward the underside of the vehicle.

In other embodiments, a system PLC can be configured to receive information from optical sensors. Upon receiving this information, the PLC will perform a look-up operation in a table in its own internal pre-programmed memory, in which table is stored specific variables, such as torque values, that are to be associated with the optical sensor information. The optical sensor information typically is associated with the aspects of the size and surface area of the vehicle to be washed. Upon identifying the associated values, one or more different values may be sent to a plurality of VFDs, each of which control an associated brush. The brushes may be one or more of vertical brushes, horizontal longitudinal brushes, horizontal transverse brushes, and/or other brushes. The PLC can then send these values to the VFDs as set point values and the PLC can cause the brush motors to be turned on. The VFDs may then monitor the substantially real time actual values on an ongoing basis during operation of each brush and control the brush as described above by sending signals to brush position locators.

Alternatively, the PLC may do the actual controlling of each brush and simply use the VFD or other sensor, to obtain information on the real time load, torque or other characteristic being monitored. The PLC can then compare the monitored values with the associated set point values related to the optical information and thus control the operation of the brush motor, brush position and other features.

In accordance with an aspect of the present invention there is provided a system for washing a side surface of a vehicle, the vehicle having an under side generally proximate a lower portion of the side surface, the system comprising: a brush rotatable about an axis that is oriented generally longitudinal and horizontal relative to the vehicle and generally parallel to the side surface of the vehicle, the brush having a plurality of cleaning elements; a drive mechanism for rotating the brush in a rotational direction that provides for upward relative movement of the cleaning elements relative to the side surface of the vehicle; a position locator for positioning the brush relative to the side surface of the vehicle and causing the brush to apply a generally transverse directed load against the side surface of the vehicle to assist in cleaning the side surface; and a variable frequency drive for driving the drive mechanism at a predetermined rotational speed, the variable frequency drive comprising a load sensor operable to measure a measured load characteristic indicative of the amount of load on the brush, and in response to the measured load characteristic exceeding a predetermined load, sending a first signal to the position locator; in operation, in response to receiving the first signal, the position locator releasing the transverse load applied against the side surface.

In accordance with another aspect of the invention there is also provided a system for washing a side surface of a vehicle comprising: a rotatable brush having a plurality of cleaning elements; a brush drive for rotating the brush in a rotational direction that provides for upward relative movement of the cleaning elements relative to the side surface of the vehicle; a position locator for positioning the brush relative to the side surface of the vehicle and causing the brush to apply a generally transverse directed load against the side surface of the vehicle; a control system for: controlling the brush drive to provide a desired rotational speed of the brush; sensing a load characteristic indicative of the amount of load on the brush; in response to a sensed load characteristic exceeding a predetermined load value, sending a first signal to the position locator; and in response to the first signal, causing the position locator to release the transverse load applied against the side surface.

In accordance with another aspect of the invention there is provided a method for washing a side surface of a vehicle having, the vehicle having an under side generally proximate a lower portion of the side surface, the method comprising: rotating a brush about an axis that is oriented generally horizontal relative to the vehicle and generally parallel to the side surface of the vehicle, the brush having a plurality of cleaning elements, the brush being rotated in a rotational direction that provides for upward relative movement of the cleaning elements relative to the side surface of the vehicle; positioning the brush relative to the side surface of the vehicle such that the brush applies a generally transverse directed load against the side surface of the vehicle to assist in cleaning the side surface; measuring a load characteristic indicative of the amount of load on the brush; and in response to a measured load characteristic exceeding a threshold load, releasing the transverse load applied against the side surface.

In accordance with another aspect of the invention there is provided a system for washing a side surface of a vehicle comprising: a rotatable brush having a plurality of cleaning elements; a brush drive for rotating the brush in a rotational direction that provides for upward relative movement of the cleaning elements relative to the side surface of the vehicle; a position locator for positioning the brush relative to the side surface of the vehicle and causing the brush to apply a generally transverse directed load against the side surface of the vehicle; an optical sensor for obtaining information relating to the size of a vehicle to be washed; and a control system for: receiving the information from the optical sensor; setting parameters for the brush drive based on the information; sensing a load characteristic indicative of the amount of load on the brush; in response to a sensed load characteristic exceeding a threshold load, sending a first signal to the position locator; and in response to the first signal, causing the position locator to release the transverse load applied against the side surface.

In accordance with another aspect of the invention there is provided a system for washing a side surface of a vehicle comprising: at least one rotatable brush; a brush drive for rotating at least one brush; a position locator for positioning the at least one brush relative to the side surface of the vehicle and causing the brush to apply a generally transverse directed load against the side surface of the vehicle; an optical sensor for obtaining information relating to the size of a vehicle to be washed; and a control system for: (a) receiving the information from the optical sensor; (b) based on the information, setting parameters of the at least one brush drive; (c) sensing a load characteristic indicative of the amount of load on the at least one brush; (d) in response to a sensed load characteristic exceeding a predetermined load, sending a first signal to the position locator; and (e) in response to the first signal, causing the position locator to release the transverse load applied against the side surface.

In accordance with another aspect of the invention there is provided a system for washing a side surface of a vehicle comprising: a plurality of rotatable brushes each having a plurality of cleaning elements; a brush drive system for rotating each of the plurality of brushes; a position locator for positioning a given brush, among the plurality of rotatable brushes, relative to the side surface of the vehicle; an optical sensor for obtaining information relating to the size of the vehicle; and a control system for: (a) receiving the information from the optical sensor; (b) setting at least one parameter associated with the brush drive system associated with each of the plurality of brushes; and (c) causing each of the plurality of brushes to be rotated with the at least one parameter.

In accordance with another aspect of the invention there is provided a system for washing a side surface of a vehicle comprising: a rotatable brush; a brush drive for rotating the brush in a rotational direction that provides for upward relative movement of the cleaning elements relative to the side surface of the vehicle; a brush support configured for supporting the brush in a generally horizontal orientation and or movement towards and away from the side surface of the vehicle, while maintaining generally longitudinal parallel alignment with the side surface; a reciprocating cylinder interconnected to the brush support, the cylinder operable to apply load to the brush support for generating a generally transverse directed load against the side surface of the vehicle from the brush; and a control system for: controlling the brush drive to provide a desired rotational speed of the brush; sensing a load characteristic indicative of the amount of load on the brush; in response to a sensed load characteristic exceeding a predetermined load value, sending a first signal to a mechanism; and in response to the first signal, the mechanism causing the cylinder to release the load applied to the brush support.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of this invention.

DETAILED DESCRIPTION

Figure 1A:
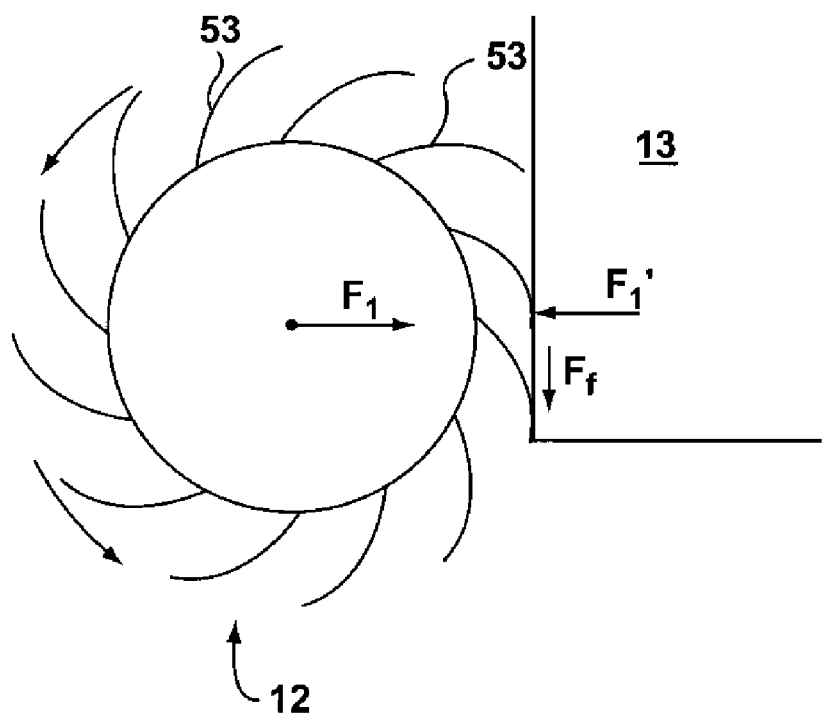
FIG. 1A is a schematic drawing illustrating the movement of a conventional brush when rotated such that there is upward movement of the brush cleaning elements relative to the side of the vehicle.

With reference first to FIG. 1A, the movement of a brush 12 is illustrated for the case wherein the brush 12 is rotated in the direction that provides upwards movement of a plurality of brush cleaning elements 53 relative to a side of a vehicle 13. In FIG. 1A, the brush 12 is pushed against the side of the vehicle 13 with a transverse force $F_1$ applied to the brush 12. When there is no-catching, etc., encountered by the brush cleaning elements 53, the transverse force $F_1$, is transmitted to the side of the vehicle 13 through the brush cleaning elements 53. A frictional force $F_f$ is exerted on the brush cleaning elements 53 as a result of the contact with the side of the vehicle 13 and transverse force $F_1$. This frictional force $F_f$ itself will tend to draw the brush downwards and, particularly when combined with the transverse force $F_1$, will tend to draw the brush 12 under the vehicle 13.

Figure 1B:
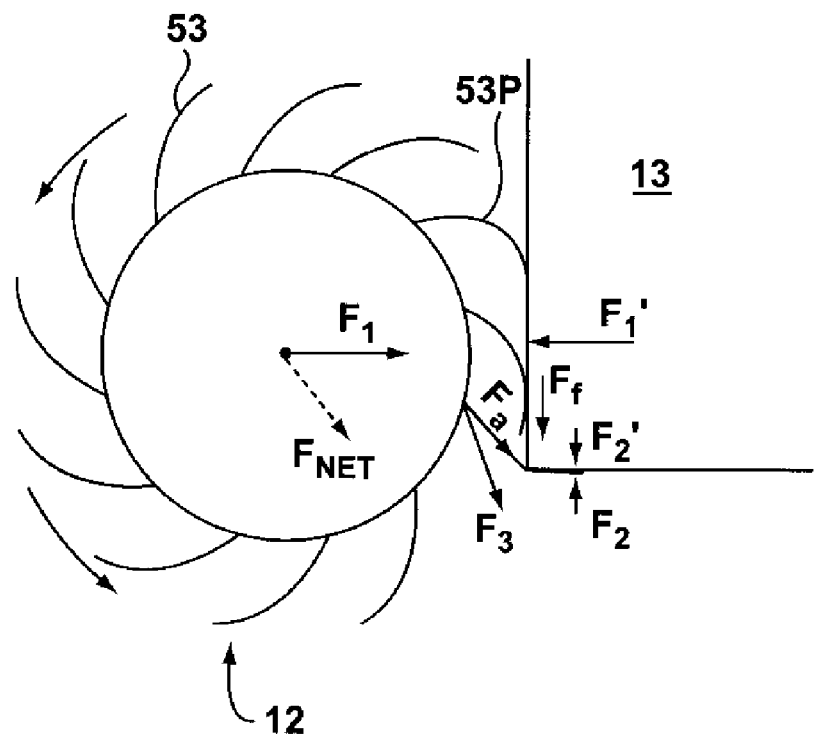
FIG. 1B is a schematic drawing illustrating the movement of a conventional brush when rotated such that there is upward movement of the brush cleaning elements relative to the side of the vehicle.

In FIG. 1B, an example situation is illustrated where one or more of the brush cleaning elements 53 on the brush catch on an underside or lower side portion of the side of the vehicle 13. As shown in FIG. 1B, when there is a deviation from the steady brush rotating state, caused, for example, by catching of the brush cleaning elements 53 on the underside of the vehicle 13, there will be an even greater tendency to be drawn under the vehicle 13 as well as a corresponding increase in torque load on the rotation of the brush 12. A normal force $F_2$, and possibly an axial force $F_a$ acting along the cleaning element 53, may result from a catching of a cleaning element on an underneath portion of the vehicle. The combination of the transverse force $F_1$, friction force $F_f$ and the forces $F_2$ and $F_a$, acting on and through those brush cleaning elements 53 that are caught, can produce a resultant force $F_3$, having the effect of trying to draw the brush underneath the vehicle 13. This is, in part, the problem the present invention is addressing.

Figure 2:
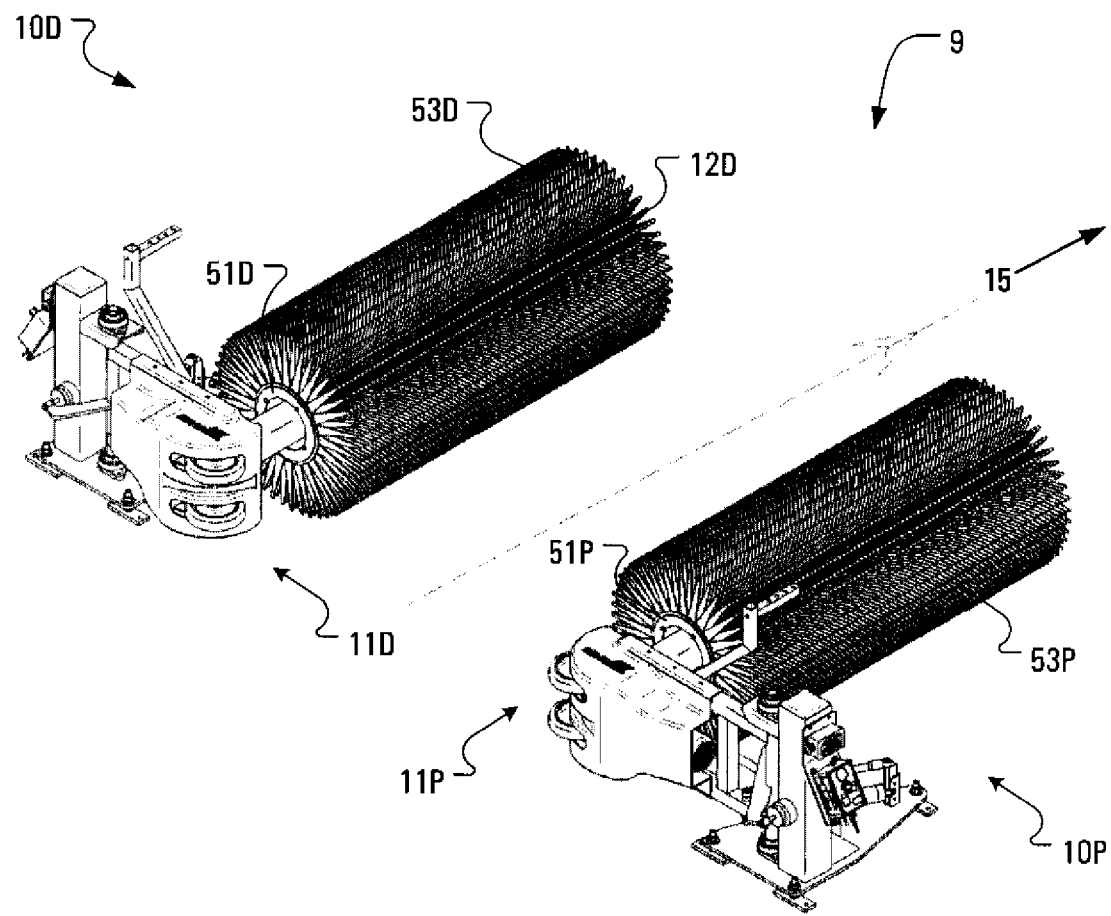
FIG. 2 illustrates a top, rear, passenger side perspective view of some components of a vehicle wash system including a driver side vehicle washing apparatus and a passenger side vehicle washing apparatus according to an example embodiment of the present invention.

With reference now to FIG. 2, illustrated are some components of an exemplary vehicle wash system generally designated 9. It will be appreciated that most vehicle car wash systems will also include other components such as pre-soak systems, rinse systems, additional cleaning devices such as additional brushes, wax application systems and drying systems. Most, if not all, of these components can be controlled by a system controller (not shown in FIG. 2). For simplicity, only some components of the exemplary vehicle car wash system 9 are shown in FIG. 2. In particular, illustrated in FIG. 2 is a driver side vehicle washing apparatus 10D, for washing the driver side of a left-hand-drive vehicle, and a passenger side vehicle washing apparatus 10P for washing the passenger side of such a vehicle.

Vehicle washing apparatus 10D is a mirror image of washing apparatus 10P, and they respectively include generally horizontal and longitudinally oriented cylindrical brushes 12D, 12P and a support frame generally indicated by reference numerals 11D, 11P. It should be noted that the term "horizontal" as an orientation refers herein, to an orientation that is generally parallel to the orientation of the ground on which a vehicle moves through the wash system as it passes the brush. A vehicle (not shown in FIG. 2) will move relative to, and between, apparatus 10D and apparatus 10P in the direction of travel designated 15.

Brushes 12D, 12P (individually or collectively 12) can be any suitable rotating cleaning device (referred to herein as "brushes") and may include a supporting hub assembly 51D, 51P, to which are secured a plurality of cleaning members 53D, 53P. Cleaning members may be made from a wide variety of materials including, but not limited to, nylon, cloth, closed cell and open cell foamed plastics, or combinations of suitable materials. A few examples of some suitable brushes are disclosed in U.S. Pat. Nos. 4,338,698 and 4,375,116 the contents of which are, in their entirety, hereby incorporated herein by reference.

Figure 3:
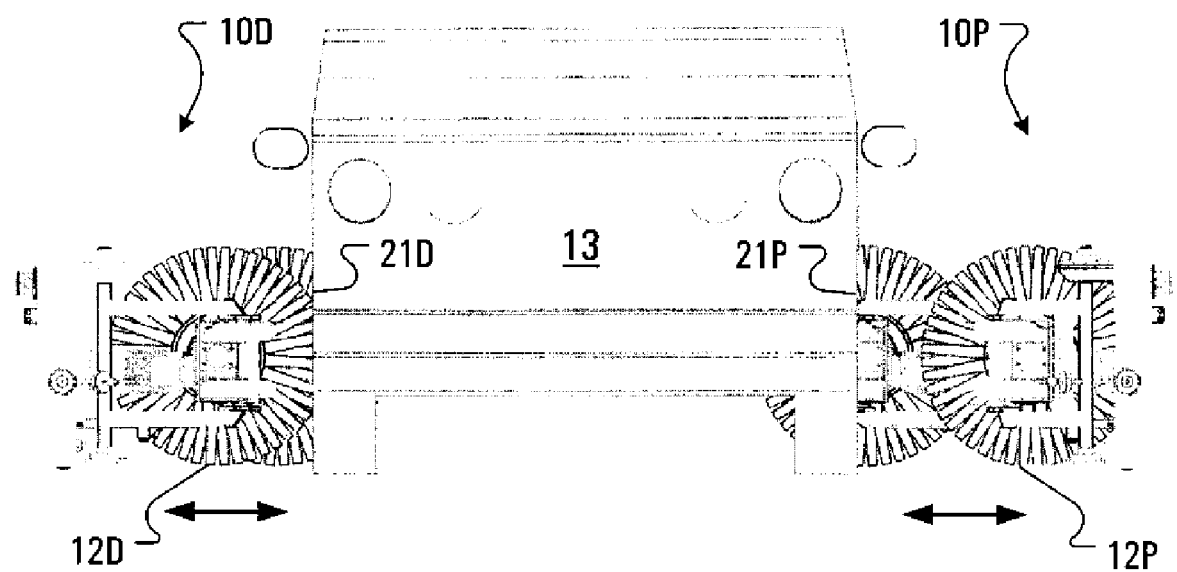
FIG. 3 illustrates a rear elevation of the wash system components of FIG. 2 including a vehicle in contact with the vehicle washing apparatus.

FIG. 3 illustrates a rear elevation view of the components illustrated in FIG. 2 and also includes a view of the rear end of a vehicle 13, also illustrating the longitudinally extending side panel surfaces 21D, 21P of the vehicle 13 are in contact with the generally horizontal and longitudinally oriented brushes 12D, 12P vehicle washing apparatus 10D, 10P respectively. Brushes 12D and 12P can be moved transversely inward and outward relative to the side surfaces 21D, 21P of vehicle 13.

Figure 4:
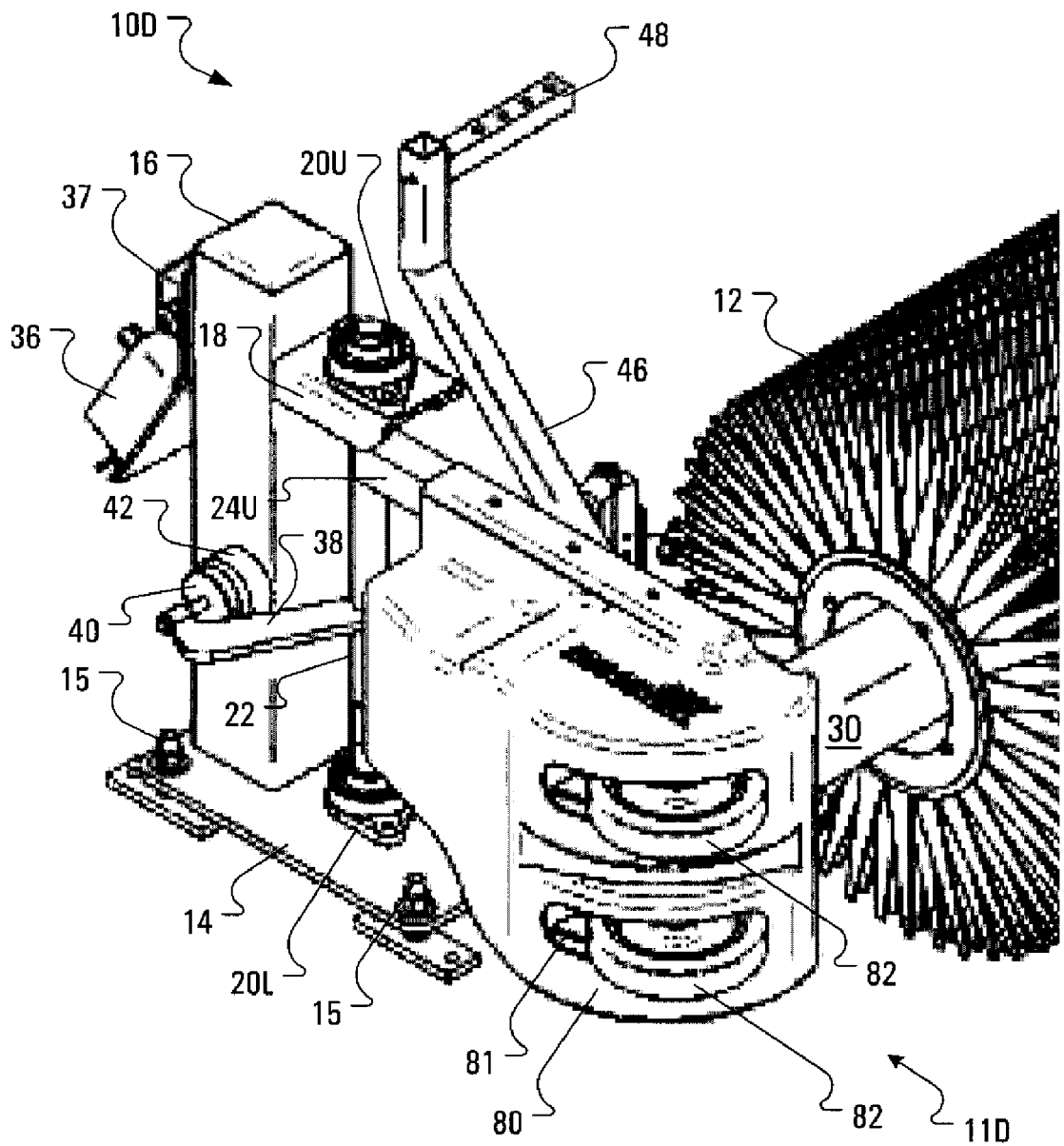
FIG. 4 illustrates a top, rear, passenger side perspective view of a portion of the driver side vehicle washing apparatus of FIG. 2.

With reference to FIG. 4, illustrating the driver side wash apparatus 10D (which is, in this example embodiment, the same as, but a mirror image of, passenger side wash apparatus 10P), the brush support frame 11D can be made from strong materials such as steel and, as illustrated, is supported by a base 14. The base 14 is illustrated as anchored to a concrete floor of a vehicle wash system tunnel by concrete anchor bolts 15, which may, for instance, be sized at ½"×2½". Extending vertically upward from the base 14 is a main post 16, from which a bracket 18 extends horizontally, proximate the top of the main post 16. Mounted to the top of the bracket 18 is an upper bearing flange 20U. An equivalent lower bearing flange 20L is mounted to the base 14 directly below the upper bearing flange 20U.

Supported by the upper bearing flange 20U and the lower bearing flange 20L is a main arm pivot rod 22 which rotates about a generally vertical axis Y-Y. Attached to the main arm pivot rod 22 are an upper main arm 24U and a lower main arm 24L (see the rear elevation view of FIG. 6) and so arms 24U and 24L can pivot about axis Y-Y. Also attached to the main arm pivot rod 22, between the upper main arm 24U and the lower main arm 24L, is a generally C-shaped, movement limiting plate 38, which extends outwardly from both sides of the rod 22. Attached to each end of the limiting plate 38, and positioned away from rod 22, are bumper stop disks 40, which are positioned to contact corresponding bumpers 42 mounted to the main post 16. The result is that the extent of the radial angle through which the main arm, including the main arm pivot rod 22, the upper main arm 24U and the lower main arm 24L, may pivot, can be limited. In an example embodiment, the angular rotation of arms 24 about axis Y-Y (FIG. 6) may be in the range of about 45 to 70 degrees.

Pivotally mounted between the distal ends of the upper main arm 24U and the lower main arm 24L is a motor mount 26 which includes a pivot shaft 55. Shaft 55 is mounted vertically in bearings 57, 59 at either end, which are in turn mounted in plates 61, 63. Plates 61, 63 are respectively fixed to arms 24U and 24L.

The motor mount 26 also includes a vertical plate 65 and a horizontal plate 66 extending from the bottom of the vertical plate 65 along travel direction 15. An electric motor 70 and a 90 degree rotation junction box 28 are mounted to the inner surface of the vertical plate 65 of the motor mount 26, while a brush mounting arm 30 is mounted to the opposite surface of the vertical plate 65 of the motor mount 26. Inside the brush mounting arm 30, a drive shaft (not shown) is held, supported by bearings, and the drive shaft passes through the vertical plate 65 of the motor mount 26 to connect with the junction box 28. Thus, rotational movement of the drive shaft on motor 70 can be transferred into rotation of the drive shaft of the cylindrical brush 12 (not shown in FIG. 5 or FIG. 6).

Figure 5:
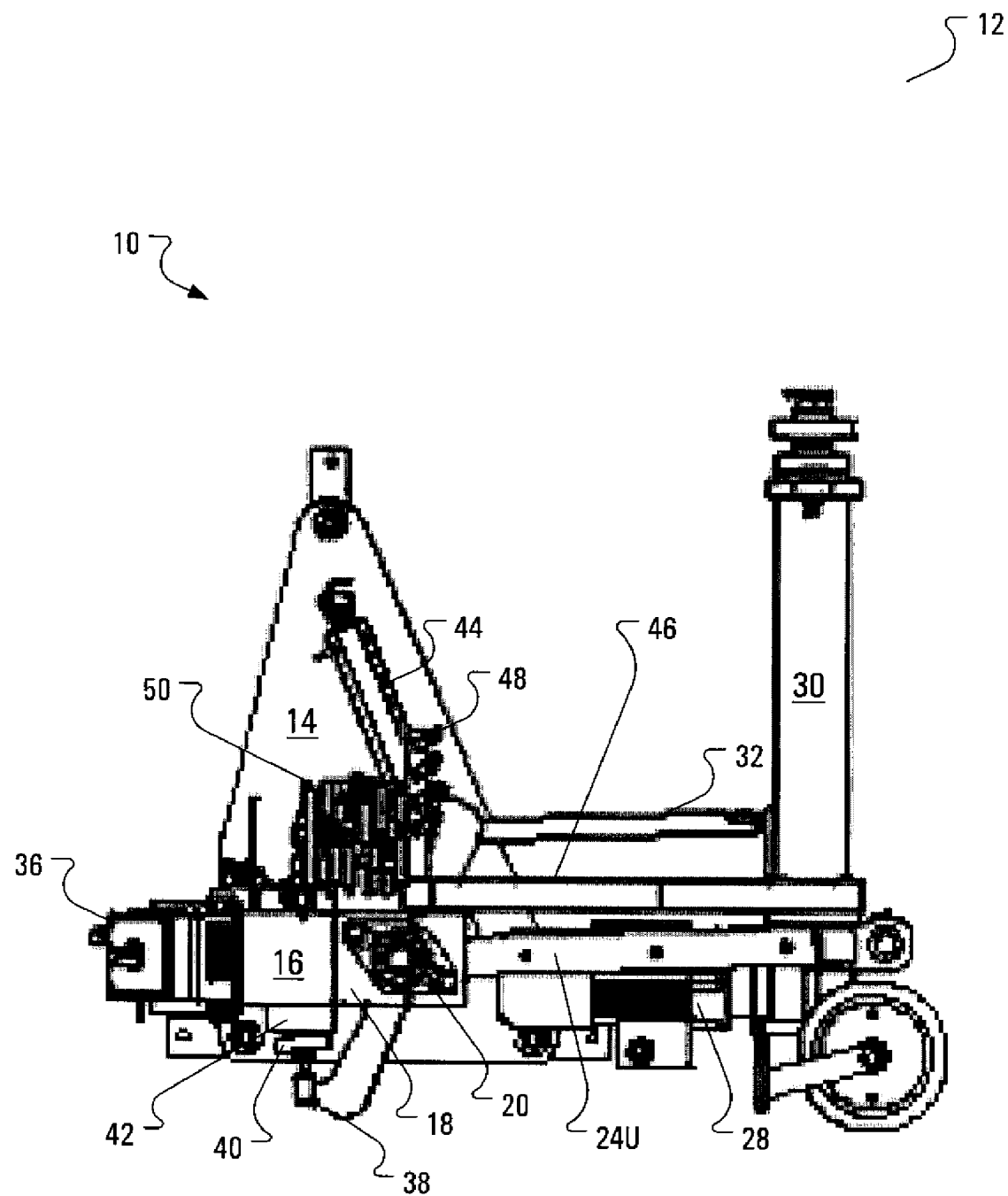
FIG. 5 illustrates a top plan view of a part of the driver side vehicle washing apparatus of FIG. 2.
Figure 6:
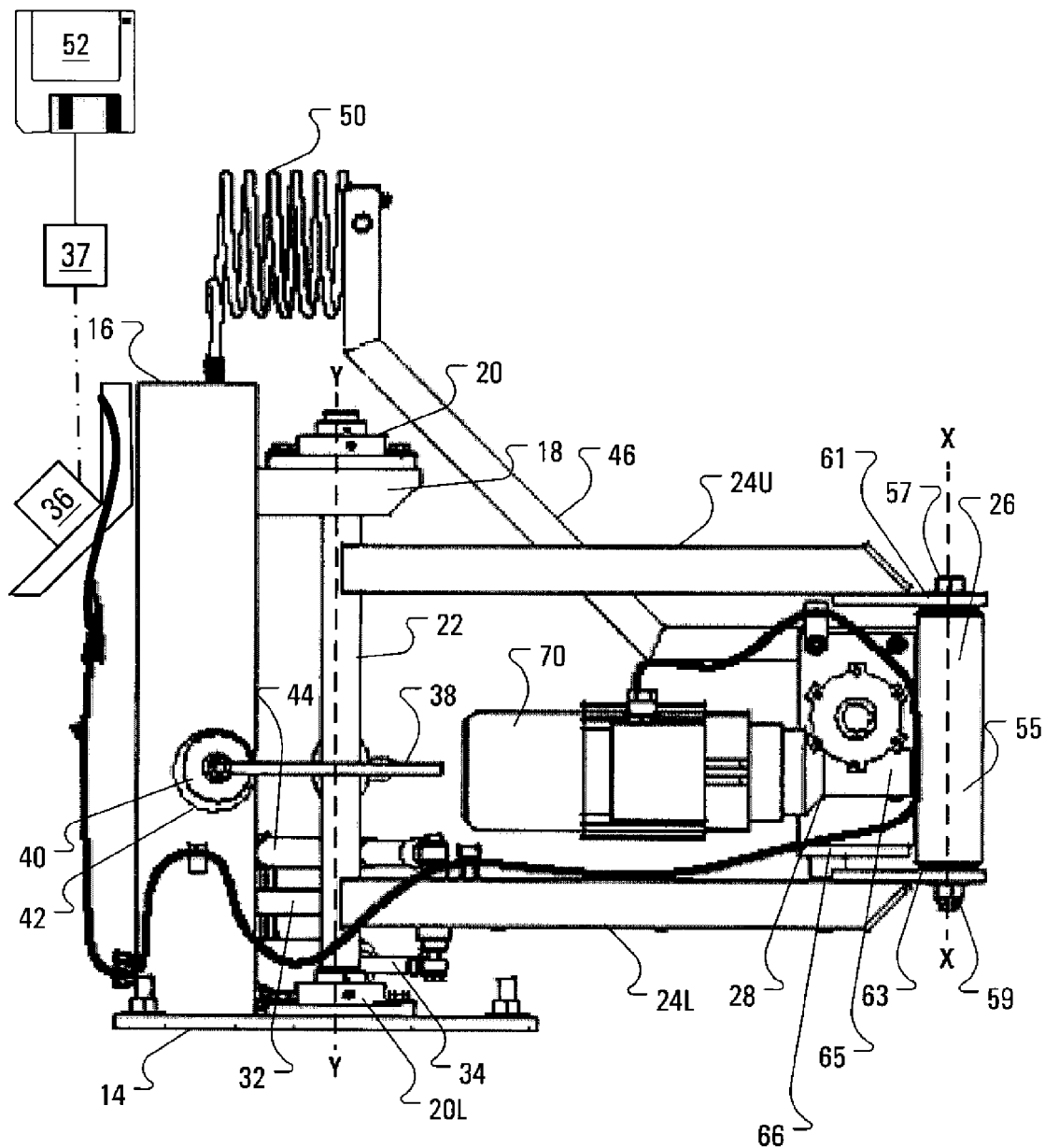
FIG. 6 illustrates a rear elevation view of the part of the driver side vehicle washing apparatus shown in FIG. 5.

The electric motor 70 may, by way of example only, be an electric motor that receives electricity from a 208 V, 230 V, 460 V or 575 V single-phase, 60 Hz alternating current supply and may be controlled by a separate Variable Frequency Drive (VFD) module (not specifically shown in FIGS. 4, 5 and 6). Alternately, a three-phase 208 VAC, 60 Hz, 0.9 kW electric motor may used as the electric motor 70 that is controlled by a VFD module.

In one example embodiment, a system programmable logic controller (PLC) 37 may be employed simply to send an instruction to the VFD, or otherwise directly to motor 70, to turn on motor 70. Once motor 70 has been turned on, the movement and load on the horizontal brush 10, may be controlled by the VFD. PLC 37 may also control much, if not all, of the rest of wash system 9, including other brushes, brush drive motors, soap valves, water valves, etc.

If PLC 37 is merely to be used to turn the motor 70 on or off, the VFD module may be independently provided with specific operation values to provide for suitable driving of the motor shaft at a desired speed and, thus, provide a desired rotational speed of the brush shaft.

In other embodiments, PLC 37 may be programmed to provide microprocessor control to motor 70 to drive the drive shaft of the motor. In particular, the PLC 37 may be programmed with specific operation values according to which the shaft should be rotated (such as a specific speed).

Figure 7A:
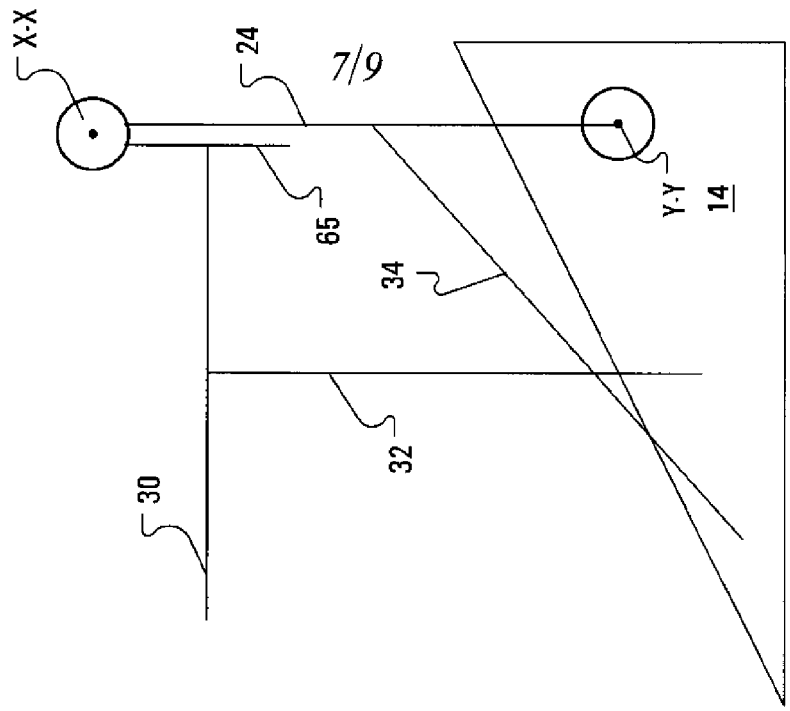
FIG. 7A is a plan sketch view of components of the driver side washing apparatus at rest.
Figure 7B:
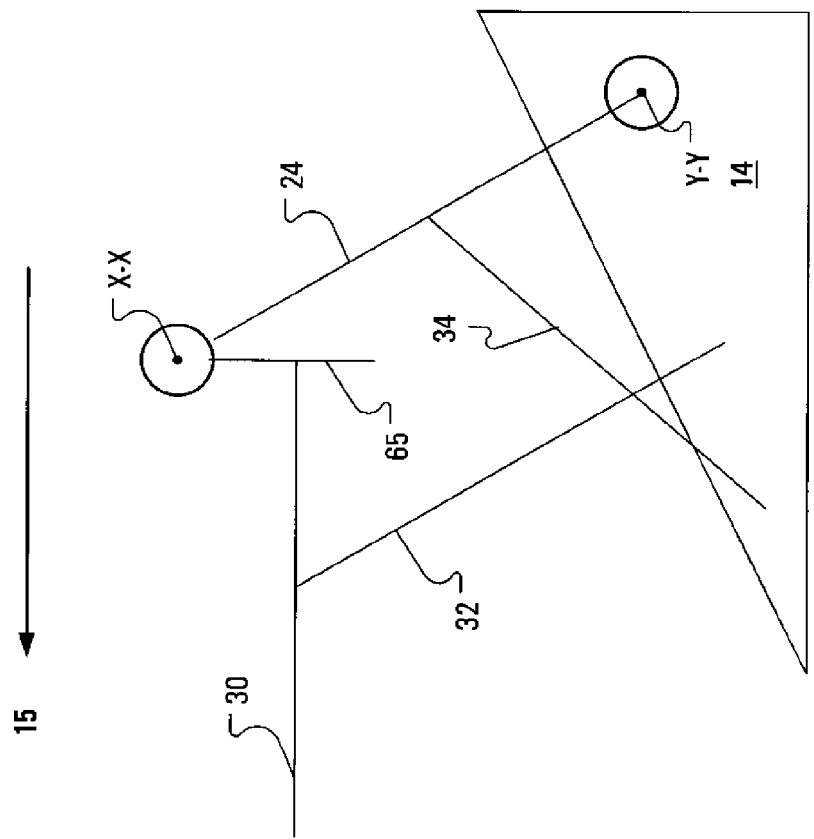
FIG. 7B is a plan sketch view of components of the driver side washing apparatus while extended toward a vehicle, thereby showing the relative movement of the components during transverse movement of a brush.

Mounted to the horizontal plate 66 is one end of a tie rod 32, while the other end of the tie rod 32 is mounted to the base 14. The effect of tie rod 32 on the movement of the components is best shown in FIGS. 7A and 7B. As arms 24U, 24L rotate with rod 22 about axis Y-Y, the motor mount including shaft 55, vertical plate 65, horizontal plate 66, motor 70, junction box 28 and brush mounting arm 30 all rotate about axis X-X. The result is that, during this movement, brush mounting arm 30, and, thus, brush 12, will remain generally longitudinally oriented (parallel to travel direction 15), but will move transversely outward and inward. In this way, the brush 12 can remain longitudinally oriented (i.e., generally parallel to the longitudinally oriented side surfaces of vehicle 13).

In some embodiments, PLC 37 may include a processor (not shown) that may be loaded with computer executable instructions for executing methods exemplary of the present invention from a computer readable medium 52 (see FIG. 6), which could be a disk, a tape, a chip or a random access memory containing a file downloaded from a remote source. Such computer executable instructions may provide the processor with logic to periodically read a received indication of a value for a sensed torque on the brush, received from the VFD, as will be discussed below, and may provide the processor with logic to, based on the received indication, provide instruction to an element of the vehicle washing apparatus 10. In particular, PLC 37 may, in response to the sensed torque or related indicator of torque on the brush, activate the position locator to reduce, or release, the transverse load on the brush. In some embodiments, and under some conditions, PLC 37 may cause the position locator to move the brush transversely away from the side surface of the vehicle.

With respect to the brush position locator, mounted to the bottom of the lower main arm 24L between the main arm pivot rod and the motor mount 26 is one end of a cylinder 34, which may be a double direction acting pneumatic cylinder. The opposite end of the pneumatic cylinder 34 is mounted to the base 14, and may have, for instance, a 2" bore and a 6" stroke. To control the pneumatic cylinder 34, an air control assembly 36 may be mounted to the main post 16. As part of the air control assembly 36, a solenoid valve (not shown) may be used to connect pneumatic tubes, from an air pressure source, to pneumatic tubes that connect to the pneumatic cylinder 34. The pneumatic tubes may be ¼" line rated for 0.5 CFM (0.014 cu m/min) and 100 PSI (6.9 BAR). Additionally, the air control assembly 36 may receive input from the PLC 37 or the VFD associated with the electric motor 70.

When PLC 37, or the VFD, sends a signal causing the cylinder 34 to be extended, the brush 12 will move transversely outward towards the center line of the direction of travel 15 and will provide a transverse load that is applied to the shaft so that the brush 12 is pushed up against the side surface of the vehicle. When PLC 37, or the VFD, sends a signal causing the cylinders 34 to be retracted, the brush 12 will move transversely inwards from the center line and will release the transverse load exerted on the shaft of the brush 12.

Mounted to the top of the lower main arm 24L between the main arm pivot rod and the motor mount 26 is one end of a shock absorber 44, while the other end of the shock absorber 44 is mounted to the base 14. The shock absorber 44 may, for instance, be a suitable gas shock absorber made by BOGE KOMPRESSOREN of Bielefeld, Germany.

A water manifold stand 46 attaches, at a proximal end, to the vertical plate of the motor mount 26 along with the brush mounting arm 30. A distal end of the water manifold stand supports a water manifold 48. The water manifold 48 may be supplied with water and cleaning solution over ¾" supply lines 50. The supply lines 50 may, for instance, be arranged to handle 4 GPM (15.1 LPM) at 40 PSI (2.7 BAR).

With reference again to FIG. 4, a cover 80 is provided to protect, in particular, the motor 70, junction box 28, brush mounting arm 30 and the brush drive shaft. Interposed through slots 81 in cover 80 are rollers 82 made of a suitable material such as a rubber. Rollers 82 help protect both the vehicle and the device 11, if a vehicle were to hit the device. This is particularly a concern in a "drive through" car wash system, where the driver actually drives the vehicle along the path 15.

In operation, a vehicle enters the wash system 9 and proceeds along a path between the driver side vehicle washing apparatus 10D and the passenger side vehicle washing apparatus 10P (see FIGS. 2 and 3). Sensing the presence of the vehicle, the PLC 37 may instruct the VFD to activate the electric motor 70 to rotate the cylindrical brush 12 of the driver side vehicle washing apparatus 10D. As should be clear, the PLC 37 may also instruct an electric motor controller to activate an electric motor 70 to rotate the cylindrical brush of the passenger side vehicle washing apparatus 10P. Upon receiving instruction from the PLC 37 to activate the electric motor 70, the VFD associated with each brush 12D, 12P may also instruct the air control assembly 36 to activate the pneumatic cylinder 34 to push on the lower main arm 24L, thereby pushing the brush mounting arm 30 and the cylindrical brush 12D, 12P towards the vehicle. Alternatively, the PLC 37 may instruct the air control assembly 36 to activate the pneumatic cylinder 34.

The vehicle-ward extent of travel of the lower main arm 24L, which is illustrated in FIG. 5, may be limited by contact between the bumper stop disk 40 on the outer end of the limiting plate 38 and the outer corresponding bumper 42 on the main post 16.

Where the electric motor 70 is controlled by the VFD, the load (or torque) experienced by the cylindrical brush 12 may be sensed by a torque sensor (not shown) that is provided in the VFD itself. This torque sensing is of particular use as the cylindrical brush 12 contacts the vehicle. The torque sensing can be used to ensure that a relatively low level or suitable level of transverse directed load is being applied by the brush against a side panel of the vehicle being cleaned. It can also be used to identify when a problem is occurring in the rotation of the brush. If the brush cleaning members get caught or dragged towards the underside of the vehicle, the load/torque on the brush 12 will increase significantly. The torque sensor associated with the VFD may sense a torque that exceeds a preset maximum torque value. In response to this, the VFD can then instruct, for example, by way of a relay, the air control assembly 36 to release the air pressure supplied to the pneumatic cylinder 34 and thereby allow the pneumatic cylinder 34 to contract. If cylinder 34 is double acting, then the cylinder can be forced to retract by applying a retraction force withdrawing the brush 12. One consequence of the contraction of the pneumatic cylinder 34 is the withdrawal of the cylindrical brush 12 away from the vehicle 13. The speed with which the cylindrical brush 12 is retracted from the vehicle 13 may, in part, be regulated by the shock absorber 44.

Once the sensed load or torque associated with the load or torque on the brush again drops below the predetermined maximum value, the VFD can again send a signal to cause the pneumatic cylinder 34 to extend, thus re-applying a transverse load on the side surface of the vehicle. This process of releasing and then re-applying and then releasing of transverse load can continue while the side surface of the vehicle is washed by the brushes. In this way the VFD controls the movement of the brush and the load applied by the brush to side surface on an ongoing basis.

An example of a suitable commercially available VFD that could be used in this embodiment is the model 3 G3JV-AB007-A manufactured by Omron IDM Controls, Inc. of Houston, Tex.

A digital torque sensor, or the ability to extract torque information, along with other information such as current flow, and other electrical characteristics, is known to be a common component or feature of such a VFD.

In an alternative embodiment, the VFD provides the information on the torque load on the brush on an ongoing basis to PLC 37. Based on the reported torque exceeding a predetermined value, the PLC 37 may instruct the air control assembly 36 to release the air pressure supplied to the pneumatic cylinder 34 and thereby allow the pneumatic cylinder 34 to contract. Once the reported torque again drops below the predetermined value, the PLC 37 may instruct the air control assembly 36 to increase the air pressure supplied to the pneumatic cylinder 34 and thereby allow the pneumatic cylinder 34 to once again extend.

The fully retracted extent of travel of the lower main arm 24L may be determined by contact between the bumper stop disk on the inner end of the limiting plate 38 and the inner corresponding bumper on the main post 16. However, it may be that the lower main arm 24L may not reach the fully retracted extent of travel responsive to the reported torque exceeding the threshold since, as the cylindrical brush 12 is retracted from the vehicle, the reported torque returns to a value that is less than the threshold and, once again, the PLC 37 may be programmed to instruct the air control assembly 36 to activate the pneumatic cylinder 34 to push on the lower main arm 24L, thereby pushing the brush mounting arm 30 and the cylindrical brush 12 back again toward the vehicle to engage the side panel.

While the pneumatic cylinder 34 controls the proximity of the cylindrical brush 12 to the vehicle and the transverse load applied by the brush 12 against the vehicle side, the tie rod 32, through a pivoting connection to the horizontal plate of the motor mount 26, maintains the brush mounting arm 30 and, consequently, the cylindrical brush 12, generally in a parallel orientation to the travel direction 15 of the vehicle and to the side surface of the vehicle.

As will be clear to a person of ordinary skill, the torque threshold programmed into the VFD, or the PLC 37, may be adjusted based on such known factors as brush friction and soap friction.

In place of the electric variable frequency drive, other devices might be used, such as a hydraulic motor. In which case, a hydraulic fluid pressure switch may be used to measure torque and trigger retraction of the brush 12 from the vehicle.

Advantages of the electric variable frequency drive over the hydraulic motor and pressure switch combination include the instantaneous, consistent and digital nature of the indicators provided by the VFD such as the torque sensing incorporated into the electric variable frequency drive. The torque sensing enables consistent control of the proximity of the cylindrical brush 12 to the vehicle.

In summary, in one example embodiment, a PLC 37 instructs the VFD to start the motor 70 rotating and the VFD instructs a position locator to position a brush proximate a vehicle and apply a predetermined transverse force against the side of the vehicle. The VFD drives the motor 70 at a desired rotational speed that is predetermined. The VFD determines a value for a load on the drive shaft of the brush and, responsive to determining such an indication, where the value exceeds a predetermined maximum value, instructs the position locator to position the brush away from the vehicle. Thereafter, when the VFD determines a value for a load on the drive shaft of the brush has dropped below the predetermined maximum value, the VFD instructs the position locator to position the brush away from the vehicle.

It should be noted that, in some embodiments, different set points could be provided, such that, if the load or torque exceeds a first maximum value, then the VFD only causes the transverse load to be reduced, or perhaps eliminated. However, if the VFD detects that the load or torque exceeds a second, higher maximum value, then the VFD will cause the position locator to actually exert a transverse load in a direction away from the side surface of the vehicle, thus freeing any caught cleaning elements.

Advantageously, aspects of the present invention allow for a predetermined maximum amount of friction to be applied by brush cleaning members onto the side of a vehicle. The friction of the cleaning members on the side of the vehicle is directly related to the torque experienced by the electric motor driven by the variable frequency drive. Thus, the "backing off" of the brush mounting arm 30 and the cylindrical brush 12, as triggered by torque sensing, may be considered to limit the amount of friction allowed to be applied to the vehicle by the cylindrical brush 12. This can reduce the risk of damage to the surface (eg. paint coating) of the vehicle.

Figure 8A:
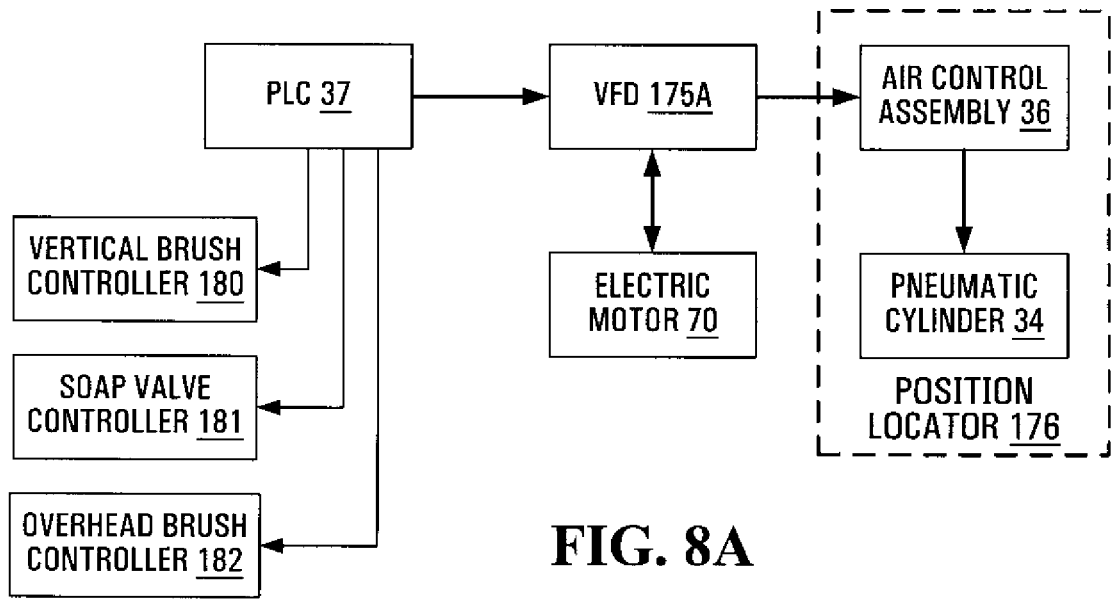
FIG. 8A schematically illustrates a wash system in accordance with a first exemplary embodiment of the invention.

With reference now to FIG. 8A, the PLC 37 provides control signals to a variety of wash system components including, for example, a vertical brush controller 180, a soap valve controller 181 and an overhead brush controller 182. The PLC 37 may also provide signals to a VFD 175A to turn on the electric motor 70. In addition to controlling the electric motor 70 to begin rotating, the VFD 175A may also signal the air control assembly 36 and the pneumatic cylinder 34 (collectively a position locator 176) to advance the cylindrical brush 12 toward the side of a vehicle to be washed and apply a transverse load against the side of the vehicle. Responsive to a sensed load, or other load indicator characteristic sensed by the VFD 175A, exceeding a predetermined/pre-selected and pre-programmed maximum or set value, the VFD 175A signals, for example, by way of a relay, the position locator 176 to operate to retract the cylindrical brush 12 away from the vehicle until the sensed load, or other indicator, drops below another predetermined/pre-selected and pre-programmed set value. Then, the VFD 175A can again signal the position locator 176 to advance the cylindrical brush 12 toward the side of the vehicle and apply a transverse load against the side of the vehicle to continue the washing process. The set values for maximum load, reactivation load and other variables can be pre-programmed into the VFD. Indeed the model 3G3JV series of VFDs made by Omron are capable of having numerous parameters selected and pre-programmed as set out in the operation manual (Products-Inverters-3 g3jv_manual.htm, available at www.omron.ca) the contents of which is hereby incorporated by reference herein.

A Proportional-Integral-Derivative (PID) feedback loop, or other control algorithm, can be employed to control the movement of the cylindrical brush 12. This provides a continuous feedback loop that keeps the washing of the side of the vehicle continuing by taking corrective action whenever there is any excess load or other deviation from a desired value of an indicator, which, in this case, may be the threshold torque or load on the brush as sensed by the sensing device. This control algorithm can, in some example embodiments, be provided by the VFD.

Figure 8B:
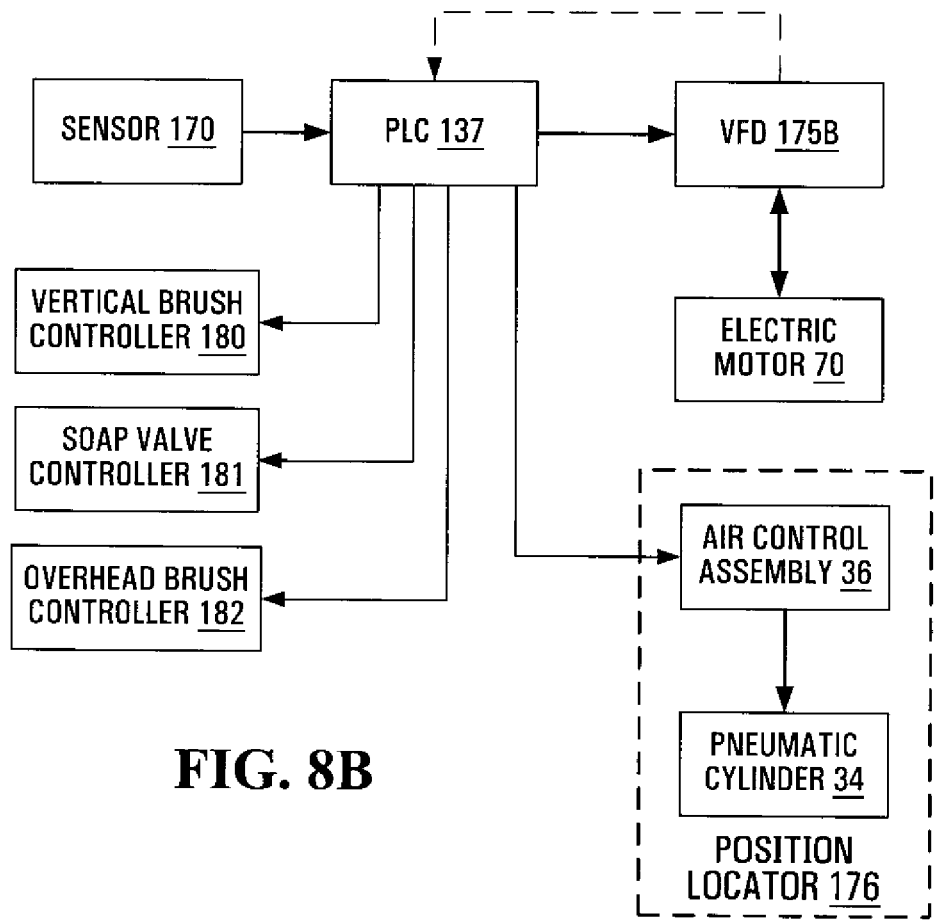
FIG. 8B schematically illustrates a wash system in accordance with a second exemplary embodiment of the invention.

In another embodiment, as shown schematically in FIG. 8B, a PLC 137 receives information relating to the features of the vehicle from a sensor 170. The sensor 170 can be an optical sensor and provide PLC 137 with information regarding the position, height and length (and possibly width, although this can be reasonably accurately derived from the height and length) of the vehicle to be washed. In this embodiment, the PLC 137 may be able to send signals to the VFD 175B not only to turn the electric motor 70 on, but also to select specific desired parameters (such as those parameters described and referenced above). For example, PLC 137 may send to the VFD 175B the set value for maximum torque load and the speed at which to drive the cylindrical brush 12, which speed may be dependent upon an estimate of the size of the surface area of the vehicle to be washed. The PLC 137 may also signal the position locator 176 to advance the cylindrical brush 12 toward the side of the vehicle and apply a transverse load against the side of the vehicle.

Figure 9:
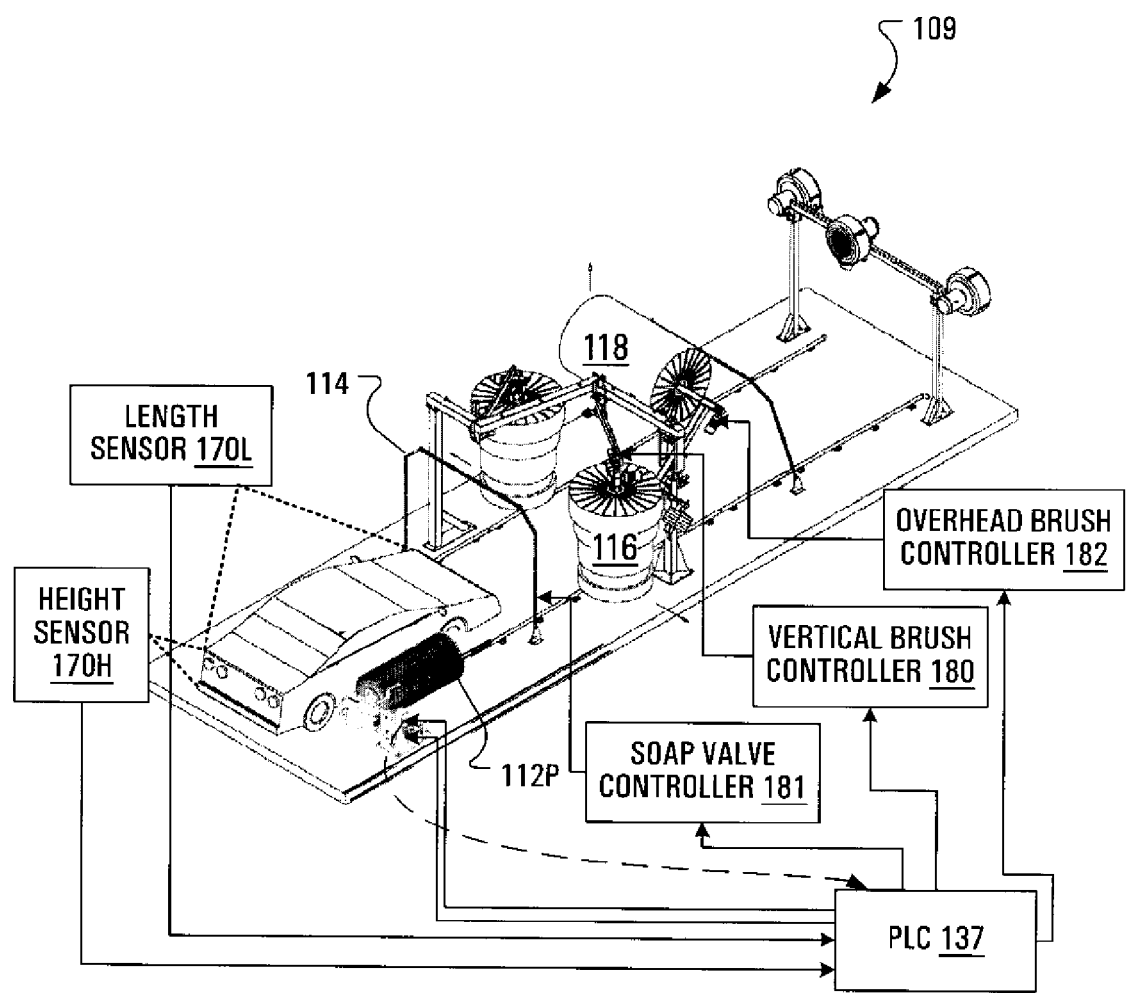
FIG. 9 is a schematic perspective view of a car wash system in accordance with the second exemplary embodiment of the invention.

FIG. 9 is a schematic perspective view of a car wash system 109 in the embodiment of FIG. 8B. The car wash system 109 includes a pair of side brushes, however, only a passenger side brush 112P is illustrated while a driver side brush is hidden by a vehicle. A gantry 114 is also illustrated as part of the car wash system 109, with many soap delivery valves (not shown) located along the interior surface of the gantry 114.

The car wash system 109 also includes a pair of vertical brushes, a passenger side vertical brush is associated with reference numeral 116. An overhead brush 118 is also illustrated as part of the car wash system 109. It should be understood, from the above, that the passenger side brush 112P, the passenger side vertical brush 116 and the overhead brush 118 are each associated with a corresponding motor whose control is provided by a corresponding VFD or other controller. In particular, as illustrated, control is provided to the passenger side vertical brush 116 by the vertical brush controller 180 and control is provided to the overhead brush 118 by the vertical brush controller 182. Additionally, control is provided to the soap valves, as part of the soap gantry 114, by the soap valve controller 181.

The sensor 170, introduced as part of the embodiment illustrated schematically in FIG. 5B, is illustrated in two parts in FIG. 9: a length sensor 170L; and a height sensor 170H.

The PLC 137 is provided to provide control to the various elements of the car wash system 109 of FIG. 9. Based on position, height and length reported to the PLC 137 by the length sensor 170L and the height sensor 170H, the PLC 137 may be able to send signals to the VFD associated with the passenger side brush 112P, the vertical brush controller 180, the soap valve controller 181 and the overhead brush controller 182 to select specific desired operation parameters for the passenger side brush 112P, the passenger side vertical brush 116, the soap valves in the gantry 114 and the overhead brush 118, respectively.

In some embodiments, the VFD for each brush motor and brush can operate as described above, whereby the VFD monitors the torque sensing or other related information and then the VFD controls the position locator as required. The control of the position locator is done by a signal that passes from the VFD to the position locator 176 causing the brush to apply a load or reduce or eliminate the transverse load applied to the vehicle side surface.

In other embodiments, the VFD 175B provides torque sensing information back to the PLC 137. Based on the received torque sensing information exceeding a threshold, the PLC 137 signals the position locator 176 to operate to retract the cylindrical brush 12 away from the vehicle until the torque sensing information received from the VFD 175B drops below another predetermined and programmed threshold. Then, the PLC 137 can again signal the position locator 176 to advance the cylindrical brush 12 toward the side of the vehicle and apply a transverse load against the side of the vehicle.

Other modifications will be apparent to those skilled in the art and, therefore, the invention is defined in the claims.

I claim:

1. A system for washing a side surface of a vehicle, said vehicle having a generally downward facing under side surface located generally proximate a lower portion of said side surface, said system comprising:
    a brush rotatable about an axis that is oriented generally longitudinal and horizontal relative to said vehicle and generally parallel to said side surface of said vehicle, said brush having a plurality of cleaning elements, said plurality of cleaning elements each having at least a portion thereof, that for at least part of the rotation about said axis, is positioned vertically below the generally downward facing under side of said vehicle;
    a drive mechanism for rotating said brush about said axis in a rotational direction that provides for upward relative movement of said cleaning elements relative to said side surface of said vehicle;
    a position locator for positioning said brush relative to said side surface of said vehicle and causing said brush to apply a generally transverse directed load against the side surface of said vehicle including said lower portion of said side surface, to assist in cleaning said side surface including said lower portion of said side surface; and
    a variable frequency drive for driving said drive mechanism at a predetermined rotational speed, said variable frequency drive comprising a load sensor operable to measure a measured load characteristic indicative of the amount of load on said brush, and in response to said measured load characteristic exceeding a predetermined load, send a first signal to said position locator;
    in operation, in response to receiving said first signal, said position locator releasing said transverse load applied against said side surface.

2. A system as claimed in claim 1 wherein said variable frequency drive is operable to, after having sent said first signal to said position locator to release said transverse load applied against said side surface, thereafter identify said measured load having fallen below said predetermined load, and send a second signal to said position locator such that in response, said position locator is operable to again apply said transverse load against said side surface of said vehicle.

3. A system as claimed in claim 2 wherein in response to said first signal said position locator is operable to release said transverse load applied against said side surface and move said brush in a direction away from said side surface of said vehicle and wherein in response to said second signal, said position locator is operable to again apply said transverse load against said side surface and move said brush against said side surface of said vehicle.

4. A system as claimed in claim 3 wherein said variable frequency device comprises a PID feedback loop capability.

5. The vehicle washing apparatus of claim 2 wherein said position locator comprises an extendable cylinder device.

6. The vehicle washing apparatus of claim 5 wherein said extendable cylinder is a pneumatic cylinder and said position locator further comprises an air control assembly.

7. The vehicle washing apparatus of claim 6 wherein said air control assembly comprises a solenoid valve which is operable to respond to said first and second signals by opening and closing said valve.

8. A system as claimed in claim 1 wherein in response to said first signal said position locator is operable to release said transverse load applied against said side surface and move said brush in a direction away from said side surface of said vehicle.

9. The vehicle washing apparatus of claim 1 wherein said measured load characteristic is a measurement of torque.

10. The vehicle washing apparatus of claim 1 wherein said drive mechanism comprises an electric motor.

11. The vehicle washing apparatus of claim 1 wherein the shape of said brush is generally cylindrical.

12. A system as claimed in claim 1 wherein said variable frequency drive is operable to, after having sent said first signal to said position locator to release said transverse load applied against said side surface, thereafter identify said measured load having fallen below a second predetermined load which is less than said predetermined load, and then send a second signal to said position locator such that in response, said position locator is operable to again apply said transverse load against said side surface of said vehicle.

13. A system as claimed in claim 1 wherein said measured load characteristic is a torque load.

14. A system for washing a side surface of a vehicle including a lower portion of said side surface, said comprising:

a rotatable brush rotatable about an axis and having a plurality of cleaning elements, said plurality of cleaning elements each having at least a portion thereof, that for at least part of the rotation about said axis, is positioned vertically below a generally horizontally oriented under side surface of said vehicle;

a brush drive for rotating said brush in a rotational direction that provides for upward relative movement of said cleaning elements relative to said side surface of said vehicle;

a position locator for positioning said brush relative to said side surface of said vehicle and causing said brush to apply a generally transverse directed load against the side surface of said vehicle including said lower portion of said side surface;

a control system for:
controlling said brush drive to provide a desired rotational speed of said brush;
sensing a load characteristic indicative of the amount of load on said brush;
in response to a sensed load characteristic exceeding a predetermined load value, sending a first signal to said position locator; and
in response to said first signal, causing said position locator to release said transverse load applied against said side surface.

15. A system as claimed in claim 14 wherein said control system is operable to, after having sent said first signal to said position locator to release said transverse load applied against said side surface, thereafter identify said measured load having fallen below said threshold load, send a second signal to said position locator such that in response, said position locator is operable to again apply said transverse load against said side surface of said vehicle.

16. A system as claimed in claim 15 wherein in response in response to said first signal said position locator is operable to release said transverse load applied against said side surface and move said brush in a direction away from said side surface of said vehicle.

17. A system as claimed in claim 16 wherein in response in response to said first signal said position locator is operable to release said transverse load applied against said side surface and move said brush in a direction away from said side surface of said vehicle and wherein in response to said second signal, said position locator is operable to again apply said transverse load against said side surface and move said brush against said side surface of said vehicle.

18. A system as claimed in claim 14 wherein said control system comprises a variable frequency drive.

19. A system as claimed in claim 18 wherein said control system also comprises a Programmable Logic Controller.

20. A method for washing a side surface of a vehicle, said vehicle having a generally horizontally extending under side generally proximate a lower portion of said side surface, said method comprising:
rotating a brush about an axis that is oriented generally horizontal relative to said vehicle and generally parallel to said side surface of said vehicle, said brush having a plurality of cleaning elements, said brush being rotated in a rotational direction that provides for upward relative movement of said cleaning elements relative to said side surface of said vehicle, said plurality of cleaning elements each having at least a portion thereof, that for at least part of the rotation about said axis, is located vertically below the generally horizontally extending under side of said vehicle;

positioning said brush relative to said side surface of said vehicle such that said brush applies a generally transverse directed load against the side surface of said vehicle to assist in cleaning said side surface including said lower portion of said side surface;
measuring a load characteristic indicative of the amount of load on said brush; and
in response to a measured load characteristic exceeding a threshold load, releasing said transverse load applied against said side surface.

21. A system for washing a side surface of a vehicle, said side surface including a lower portion located proximate a generally horizontally extending under side of said vehicle, said system comprising:
a rotatable brush having a plurality of cleaning elements, said plurality of cleaning elements each having at least a portion thereof, that for at least part of the rotation about said axis, is positioned vertically below the generally horizontally extending under side of said vehicle;
a brush drive for rotating said brush in a rotational direction that provides for upward relative movement of said cleaning elements relative to said side surface of said vehicle;
a position locator for positioning said brush relative to said side surface of said vehicle and causing said brush to apply a generally transverse directed load against the side surface of said vehicle including said lower portion of said side surface;
an optical sensor for obtaining information relating to the size of a vehicle to be washed; and
a control system for:
receiving said information from said optical sensor;
setting parameters for said brush drive based on said information;
sensing a load characteristic indicative of the amount of load on said brush;
in response to a sensed load characteristic exceeding a threshold load, sending a first signal to said position locator; and
in response to said first signal, causing said position locator to release said transverse load applied against said side surface.

22. A system as claimed in claim 21 wherein said optical sensor is for obtaining information relating to the size and shape of a vehicle to be washed and said control system is for setting parameters for said brush drive based on said information.

23. A system for washing a side surface of a vehicle, said side surface including a lower portion located generally proximate a generally downward facing under side of the vehicle, said system comprising:
at least one rotatable brush rotatable about an axis that is oriented generally longitudinal and horizontal relative to said vehicle and generally parallel to said side surface of said vehicle, said brush having a plurality of cleaning elements, said plurality of cleaning elements each having at least a portion thereof, that for at least part of the rotation about said axis, is positioned vertically below the generally downward facing under side of said vehicle;
a brush drive for rotating said at least one brush in a rotational direction about a generally horizontally and longitudinally oriented axis and that provides for upward relative movement of said cleaning elements relative to said side surface of said vehicle;
a position locator for positioning said at least one brush relative to said side surface of said vehicle and causing said brush to apply a generally transverse directed load against the side surface of said vehicle including said lower portion of said side surface;

an optical sensor for obtaining information relating to the size of a vehicle to be washed; and a control system for:
(a) receiving said information from said optical sensor;
(b) based on said information, setting parameters of said at least one brush drive;
(c) sensing a load characteristic indicative of the amount of load on said at least one brush;
(d) in response to a sensed load characteristic exceeding a predetermined load, sending a first signal to said position locator; and
(e) in response to said first signal, causing said position locator to release said transverse load applied against said side surface.

24. A system as claimed in claim 23 wherein said at least one brush comprises a plurality of brushes and a plurality of brush drives for rotating said plurality of brushes.

25. A system for washing a side surface of a vehicle, said side surface including a lower portion located generally adjacent a generally horizontally oriented and downward facing under side surface of said vehicle, said system comprising:

a rotatable brush rotatable about an axis that is oriented generally longitudinal and horizontal relative to said vehicle and generally parallel to said side surface of said vehicle, said brush having a plurality of cleaning elements, said plurality of cleaning elements each having at least a portion thereof, that for at least part of the rotation about said axis, is positioned vertically below the generally downward facing under side of said vehicle;

a brush drive for rotating said brush in a rotational direction that provides for upward relative movement of said cleaning elements relative to said side surface of said vehicle;

a brush support configured for supporting said brush in a generally horizontal orientation and for movement towards and away from said side surface of said vehicle including said lower portion of said side surface, while maintaining generally longitudinal parallel alignment with said side surface;

a reciprocating cylinder interconnected to said brush support, said cylinder operable to apply load to said brush support for generating a generally transverse directed load against the side surface of said vehicle, including said lower portion of said side surface, from said brush; and a control system for:
controlling said brush drive to provide a desired rotational speed of said brush;
sensing a load characteristic indicative of the amount of load on said brush;
in response to a sensed load characteristic exceeding a predetermined load value, sending a first signal to a mechanism; and
in response to said first signal, said mechanism being operable to cause said cylinder to release said load applied to said brush support.

* * * * *